United States Patent
Shin et al.

(10) Patent No.: US 8,894,880 B2
(45) Date of Patent: Nov. 25, 2014

(54) WHOLLY AROMATIC LIQUID CRYSTAL POLYESTER RESIN COMPOUND HAVING IMPROVED INSULATION PROPERTIES

(75) Inventors: Young Hak Shin, Daejeon (KR); Youn Eung Lee, Daejeon (KR); Myung Se Lee, Daejeon (KR); Jin Kyu Lee, Busan (KR); Mahn Jong Kim, Daejeon (KR)

(73) Assignee: Samsung Fine Chemicals Co., Ltd, Ulsan (KR)

( * ) Notice: Subject to any disclaimer, the term of this patent is extended or adjusted under 35 U.S.C. 154(b) by 0 days.

(21) Appl. No.: 13/808,883

(22) PCT Filed: Jun. 14, 2011

(86) PCT No.: PCT/KR2011/004324
§ 371 (c)(1),
(2), (4) Date: Jan. 7, 2013

(87) PCT Pub. No.: WO2012/005452
PCT Pub. Date: Jan. 12, 2012

(65) Prior Publication Data
US 2013/0112917 A1    May 9, 2013

(30) Foreign Application Priority Data
Jul. 7, 2010  (KR) .................. 10-2010-0065456

(51) Int. Cl.
| | | |
|---|---|---|
| C09K 19/38 | (2006.01) | |
| C09K 19/54 | (2006.01) | |
| H01B 3/04 | (2006.01) | |
| H01B 3/42 | (2006.01) | |
| C08L 63/02 | (2006.01) | |
| C08K 3/34 | (2006.01) | |
| H01B 3/00 | (2006.01) | |
| H01B 3/47 | (2006.01) | |
| C09K 19/52 | (2006.01) | |

(52) U.S. Cl.
CPC ............. $C09K\ 19/54$ (2013.01); $C09K\ 19/3809$ (2013.01); $H01B\ 3/423$ (2013.01); $H01B\ 3/006$ (2013.01); $H01B\ 3/42$ (2013.01); $H01B\ 3/47$ (2013.01); $C09K\ 2019/521$ (2013.01)
USPC .................. 252/299.01; 252/299.5; 524/449; 526/190

(58) Field of Classification Search
USPC ................. 252/299.5, 299.6, 299.67, 299.01; 528/190
See application file for complete search history.

(56) References Cited

U.S. PATENT DOCUMENTS

| | | | |
|---|---|---|---|
| 2003/0008979 A1* | 1/2003 | Suenaga et al. ................ | 525/410 |
| 2006/0047100 A1* | 3/2006 | Murouchi et al. ............ | 528/272 |
| 2013/0026413 A1* | 1/2013 | Uchida et al. ............ | 252/299.62 |
| 2013/0116397 A1* | 5/2013 | Chang et al. .................. | 528/190 |
| 2013/0231434 A1* | 9/2013 | Lee et al. ...................... | 524/449 |

FOREIGN PATENT DOCUMENTS

| | | |
|---|---|---|
| JP | 10-292098 A | 11/1998 |
| JP | 2000-119497 A | 4/2000 |
| JP | 3098042 B2 | 8/2000 |
| KR | 10-0797809 B1 | 1/2008 |
| WO | 98/36028 | 8/1998 |

OTHER PUBLICATIONS

International Search Report and Written Opinion from the International Bureau of WIPO for International Application No. PCT/KR2011/004324 dated Feb. 29, 2019 and English translation of the same (11 pages).

* cited by examiner

*Primary Examiner* — Shean C Wu
(74) *Attorney, Agent, or Firm* — Fitch Even Tabin & Flannery, LLP

(57) ABSTRACT

Provided is a wholly aromatic liquid crystalline polyester resin compound having excellent electrical insulating properties, heat resistance, and mechanical strength due to the inclusion of an inorganic filler having low electrical conductivity, high heat resistance, and high mechanical strength.

6 Claims, No Drawings

WHOLLY AROMATIC LIQUID CRYSTAL POLYESTER RESIN COMPOUND HAVING IMPROVED INSULATION PROPERTIES

CROSS-REFERENCE TO RELATED APPLICATIONS

This application is a National Phase Patent Application of International Patent Application Number PCT/KR2011/004324, filed on Jun. 14, 2011, which claims priority of Korean Patent Application Number 10-2010-0065456, filed Jul. 7, 2010, which are hereby incorporated herein by reference in their entirety.

FIELD OF THE INVENTION

The present invention relates to a wholly aromatic liquid crystalline polyester resin compound, and more particularly, to a wholly aromatic liquid crystalline polyester resin compound having excellent electrical insulating properties due to inclusion of an inorganic filler having low electrical conductivity.

BACKGROUND OF THE INVENTION

Wholly aromatic liquid crystalline polyester resins have excellent heat resistance and dimensional stability, and excellent fluidity when they are molten, and due to such properties, they are used as a material for precision injection moulding in a wide range of applications including electronic parts. In particular, due to excellent dimensional stability and electrical insulating properties, the application range of wholly aromatic liquid crystalline polyester resins extends to a film for electronic materials and a material for substrates.

In detail, wholly aromatic liquid crystalline polyester resins are widely used in electronic parts requiring high electrical insulating properties after they are formed as a resin compound. However, since electrical insulating properties of conventional resin compounds are not sufficiently high, when they are used in, for example, electronic parts that are subject to high voltages, such as a microwave range, the insulating properties are destroyed and thus arc resistance is reduced, thereby leading to the destruction of the electronic parts.

SUMMARY OF THE INVENTION

The present invention provides a wholly aromatic liquid crystalline polyester resin compound having excellent electrical insulating properties due to the inclusion of an inorganic filler having low electrical conductivity.

According to an aspect of the present invention, there is provided a wholly aromatic liquid crystalline polyester resin compound including: a wholly aromatic liquid crystalline polyester resin, a first inorganic filler having a surface resistivity of $10^{13}\Omega/\text{sq}$ or more, and a second inorganic filler having a surface resistivity of $10^{13}\Omega/\text{sq}$ or more and higher heat resistance (ASTM D648) and mechanical strength than those of the first inorganic filler, wherein the wholly aromatic liquid crystalline polyester resin compound has an arc resistance grade (ASTM D495) of 3 grade or lower and a heat resistance (ASTM D648) of 250° C. or more.

The first inorganic filler may include at least one selected from the group consisting of mica, talc, and wollastonite.

An amount of the first inorganic filler may be from 5 to 40 parts by weight based on 100 parts by weight of the wholly aromatic liquid crystalline polyester resin.

The second inorganic filler may include at least one selected from the group consisting of a long glass fiber, a short glass fiber, and whisker.

An amount of the second inorganic filler may be from 5 to 40 parts by weight based on 100 parts by weight of the wholly aromatic liquid crystalline polyester resin.

A wholly aromatic liquid crystalline polyester resin compound according to an embodiment of the present invention has excellent electrical insulating properties, heat resistance, and mechanical strength due to the inclusion of an inorganic filler having low electrical conductivity, high heat resistance, and high mechanical strength therein. Thus, the wholly aromatic liquid crystalline polyester resin compound is suitable for use as a material for a high-voltage electronic part.

DETAILED DESCRIPTION OF THE PREFERRED EMBODIMENTS

Hereinafter, a wholly aromatic liquid crystalline polyester resin compound and a method of preparing the same, according to embodiments of the present invention, will be described in detail.

A wholly aromatic liquid crystalline polyester resin compound according to an embodiment of the present invention includes a wholly aromatic liquid crystalline polyester resin, a first inorganic filler having a surface resistivity of $10^{13}\Omega/\text{sq}$ or more, and a second inorganic filler having a surface resistivity of $10^{13}\Omega/\text{sq}$ or more and higher heat resistance (ASTM D648) and mechanical strength than those of the first inorganic filler, wherein the wholly aromatic liquid crystalline polyester resin compound has an arc resistance grade (ASTM D495) of 3 grade or lower and a heat resistance (ASTM D648) of 250° C. or more. In this regard, the term 'mechanical strength' refers to a property that is not deformed by external force, and examples of such a property are tensile strength and flexural strength.

If surface resistivities of the first inorganic filler and the second inorganic filler are within the ranges as described above, the first inorganic filler and the second inorganic filler have non-conductive properties and thus the wholly aromatic liquid crystalline polyester resin compound including the first and second inorganic fillers has excellent electrical insulating properties. Also, the second inorganic filler having higher heat resistance and mechanical strength than those of the first inorganic filler provides high heat resistance and mechanical strength to a wholly aromatic liquid crystalline polyester resin compound including the second inorganic filler. Also, if the wholly aromatic liquid crystalline polyester resin compound has the arc resistance grade (ASTM D495) of 3 grade or lower and the heat resistance (ASTM D648) of 250° C. or more, even when the wholly aromatic liquid crystalline polyester resin compound is used in an electronic part that is subject to high voltages, the insulating properties of the wholly aromatic liquid crystalline polyester resin compound are sustained and thus arc discharge does not occur, thereby preventing the destruction of the electronic part.

The wholly aromatic liquid crystalline polyester resin may be prepared through the following processes:

(a) synthesizing a wholly aromatic liquid crystalline polyester prepolymer by condensation polymerization of at least two monomers; and (b) synthesizing a wholly aromatic liquid crystalline polyester resin by solid phase condensation polymerization of the prepolymer.

The monomers used in process (a) may include at least one compound selected from the group consisting of aromatic diol, aromatic diamine and aromatic hydroxylamine; and an aromatic dicarboxylic acid. Also, the monomers may further include an aromatic hydroxy carboxylic acid and/or an aromatic amino carboxylic acid.

The synthesis method used in process (a) may be solution condensation polymerization or bulk condensation polymerization. In addition, in process (a), the condensation reaction may be expedited by using a monomer whose reactivity is increased (i.e., a cylated monomer) by pretreating it with a chemical material, such as an acylating agent (in particular, an acetylating agent).

To perform the solid phase condensation polymerization in process (b), the prepolymer needs to be appropriately heated, and examples of the heating method are a method using a heating plate, a method using hot air, and a method using high-temperature fluid. By-products generated during solid phase condensation polymerization may be removed by purging with inert gas or by applying vacuum thereto.

The wholly aromatic liquid crystalline polyester resin may have various repeating units in a chain thereof, and examples of the repeating units are as follows:

(1) an aromatic diol-derived repeating unit:
—O—Ar—O—,
(2) an aromatic diamine-derived repeating unit:
—HN—Ar—NH—,
(3) an aromatic hydroxyamine-derived repeating unit:
—HN—Ar—O—,
(4) an aromatic dicarboxylic acid-derived repeating unit:
—OC—Ar—CO—,
(5) an aromatic hydroxy carboxylic acid-derived repeating unit:
—O—Ar—CO—,
(6) an aromatic amino carboxylic acid-derived repeating unit: —HN—Ar—CO—.

In the formulae defined above, Ar may be phenylene, biphenylene, naphthalene, an aromatic compound in which two phenylenes are bonded to each other via a carbon or non-carbon element, or an aromatic compound selected from the group consisting of phenylene, biphenylene, naphthalene, or two phenylene bonded to each other by carbon or a non-carbon element in which at least one hydrogen atom is substituted with other elements.

The first inorganic filler may include at least one selected from the group consisting of mica, talc, and wollastonite.

An amount of the first inorganic filler may be from 5 to 40 parts by weight based on 100 parts by weight of the wholly aromatic liquid crystalline polyester resin. If the amount of the first inorganic filler is within the range described above, the electrical insulating properties of the wholly aromatic liquid crystalline polyester resin compound may be substantially improved.

The second inorganic filler may include at least one selected from the group consisting of a long glass fiber, a short glass fiber, and whisker.

Also, an amount of the second inorganic filler may be from 5 to 40 parts by weight based on 100 parts by weight of the wholly aromatic liquid crystalline polyester resin.

If the amount of the second inorganic filler is within the range described above, heat resistance and mechanical strength, which are properties that are not sufficiently provided by the first inorganic filler, may be provided to the wholly aromatic liquid crystalline polyester resin compound while electrical insulating properties of the wholly aromatic liquid crystalline polyester resin compound are maintained at high level.

The wholly aromatic liquid crystalline polyester resin compound may further include a stabilizer as an additive. The stabilizer may include at least one selected from the group consisting of calcium montanate (Ca-MON), calcium behenate (Ca-BEH), and calcium stearate (Ca-ST).

In order to prepare the wholly aromatic liquid crystalline polyester resin compound, 5 to 40 parts by weight of the first inorganic filler and 5 to 40 parts by weight of the second inorganic filler based on 100 parts by weight of the wholly aromatic liquid crystalline polyester resin are mixed to prepare a resin composition, and the resin composition is dried and then melt-kneaded.

The melt-kneading may be performed by using a twin-screw extruder, a batch type kneader, or a mixing roll. Also, a lubricant may be used during melt-kneading so as to smoothly perform melt-kneading.

Also, the wholly aromatic liquid crystalline polyester resin compound may further include a stabilizer as described above so as to improve the injection moulding stability and measuring properties of the prepared wholly aromatic liquid crystalline polyester resin compound after the melt-kneading.

After the melt-kneading or after the addition of the stabilizer, the wholly aromatic liquid crystalline polyester resin compound is sufficiently mixed to uniformly melt fuse the first and second inorganic fillers and the stabilizer as additives on a surface of the wholly aromatic liquid crystalline polyester resin compound including the additives, and then, the mixture is dried at a temperature equal to higher than a melting point of the additives for 2 or more hours.

Also, an embodiment of the present invention provides a part of an electric transformer including the wholly aromatic liquid crystalline polyester resin compound, and an example of the part is an insulating film.

Hereinafter, the present invention will be described in further detail with reference to examples. However, the present invention is not limited to the examples.

EXAMPLES

Example 1

(1) Selection of Wholly Aromatic Liquid Crystalline Polyester Resin

A KF-grade wholly aromatic polyester resin manufactured by Samsung Fine Chemicals Co., Ltd., was used. A melting point of the resin measured using a differential scanning calorimeter was 350° C.

(2) Preparation of Wholly Aromatic Liquid Crystalline Polyester Resin Compound (1)

The wholly aromatic liquid crystalline polyester resin selected in (1) above, mica (surface resistivity=$10^{13} \Omega/\text{sq}$) (DongYang Materials Industrial Co., Ltd., Mica#400), and a short glass fiber (surface resistivity $10^{13} \Omega/\text{sq}$)(Sungjin Fiber Co., Ltd., MF150W-NT) were loaded in a weight ratio of 6:1:3 into an automatic mixer (product of Jeil Industry Device Co., Ltd), and then mixed for 20 minutes, dried using a square drying oven (Jeil Industry Device Co., Ltd) at a temperature of 130° C. for 2 hrs, and melt-kneaded by using a twin-screw extruder (L/D: 40, diameter: 25 mm)(Collin Company), thereby preparing a wholly aromatic liquid crystalline polyester resin compound (1). Also, during the melt-kneading, vacuum was applied to the 2-screw extruder to remove by-products.

(3) Adding of Stabilizer to Wholly Aromatic Liquid Crystalline Polyester Resin Compound (1)

100 ppm of Ca-ST based on the weight of the wholly aromatic liquid crystalline polyester resin compound (1) was added to the wholly aromatic liquid crystalline polyester resin compound (1) prepared in (2) above, and then, the mixture was stirred by using an automatic mixer (Jeil Industry Device Co., Ltd) for 10 minutes and dried by using a square drying oven (Jeil Industry Device Co., Ltd) at a temperature of 130° C. for 2 hours.

Example 2

A wholly aromatic liquid crystalline polyester resin compound (2) was prepared in the same manner as in Example 1, except that a mix weight ratio of the wholly aromatic liquid crystalline polyester resin selected in (1) of Example 1, mica (surface resistivity=$10^{13}$Ω/sq)(DongYang Materials Industrial Co., Ltd., Mica#400), and a short glass fiber (surface resistivity $10^{13}$Ω/sq) (Sungjin Fiber Co., Ltd., MF150W-NT) was 6:2:2.

Example 3

A wholly aromatic liquid crystalline polyester resin compound (3) was prepared in the same manner as in Example 1, except that a mix weight ratio of the wholly aromatic liquid crystalline polyester resin selected in (1) of Example 1, mica (surface resistivity=$10^{13}$Ω/sq) (DongYang Materials Industrial Co., Ltd., Mica#400), and a short glass fiber (surface resistivity $10^{13}$Ω/sq) (Sungjin Fiber Co., Ltd., MF150W-NT) was 6:3:1.

Comparative Example 1

A wholly aromatic liquid crystalline polyester resin compound (4) was prepared in the same manner as in Example 1, except that a mix weight ratio of the wholly aromatic liquid crystalline polyester resin selected in (1) of Example 1, mica (surface resistivity=$10^{13}$Ω/sq) (DongYang Materials Industrial Co., Ltd., Mica#400), and a short glass fiber (surface resistivity $10^{13}$Ω/sq) (Sungjin Fiber Co., Ltd., MF150W-NT) was 6:1:0 (that is, short glass fiber was not used).

Comparative Example 2

A wholly aromatic liquid crystalline polyester resin compound (5) was prepared in the same manner as in Example 1, except that a mix weight ratio of the wholly aromatic liquid crystalline polyester resin selected in (1) of Example 1, mica (surface resistivity=$10^{13}$Ω/sq) (DongYang Materials Industrial Co., Ltd., Mica#400), and a short glass fiber (surface resistivity $10^{13}$Ω/sq) (Sungjin Fiber Co., Ltd., MF150W-NT) was 6:0:3 (that is, mica was not used).

Evaluation Example

A specimen of each of the wholly aromatic liquid crystalline polyester resin compounds (1) to (5) prepared according to Examples 1 to 3 and Comparative Examples 1 to 2 as an extrusion raw material was manufactured in a size of length 50 mm×width 50 mm×thickness 3 mm by using an injection extruder (FANUC ROBOSHOT 2000i-50B) at a cylinder temperature of 380° C., at a mould temperature of 120° C., at an extrusion speed of 150 mm/s, and at a cooling time of 10 seconds.

(Measurement of Heat Resistance)

Heat resistance of each of the specimens was measured according to ASTM D648.

(Measurement of Arc Resistance (Electrical Insulating Properties))

Arc resistance of each of the specimens was measured according to ASTM D495. The smaller the arc resistance grade, the higher the arc resistance.

(Measurement of Tensile Strength)

Tensile strength of each of the specimens was measured according to ASTM D638.

(Measurement of Flexural Strength)

Flexural strength of each of the specimens was measured according to ASTM D790.

TABLE 1

|  | Example 1 | Example 2 | Example 3 | Comparative Example 1 | Comparative Example 2 |
| --- | --- | --- | --- | --- | --- |
| Heat resistance (° C.) | 299 | 293 | 290 | 254 | 310 |
| Arc resistance (grade) | 3 | 3 | 3 | 2 | 5 |
| Tensile strength (MPa) | 126 | 125 | 118 | 105 | 129 |
| Flexural strength (MPa) | 168 | 165 | 157 | 142 | 172 |

Referring to Table 1, the wholly aromatic liquid crystalline polyester resin compounds (1) to (3) prepared according to Examples 1 to 3 have relatively high heat resistance, arc resistance, tensile strength, and flexural strength, thus, confirming that the wholly aromatic liquid crystalline polyester resin compounds are suitable for use as a material for a high-voltage electronic part that requires excellent arc resistance (electrical insulating properties) and mechanical properties. However, the wholly aromatic liquid crystalline polyester resin compound (4) prepared according to Comparative Example 1 has relatively high heat resistance and arc resistance and relatively low tensile strength and flexural strength, thus, confirming that the wholly aromatic liquid crystalline polyester resin compound (4) is not suitable for use as a material for a high-voltage electronic part that requires excellent mechanical properties.

Also, the wholly aromatic liquid crystalline polyester resin compound (5) prepared according to Comparative Example 2 has relatively high heat resistance, tensile strength, and flexural strength, and very low arc resistance, and thus, confirming that the wholly aromatic liquid crystalline polyester resin compound (5) is not suitable for use as a material for a high-voltage electronic part that necessarily requires excellent arc resistance.

While the present invention has been particularly shown and described with reference to exemplary embodiments thereof, it will be understood by those of ordinary skill in the art that various changes in form and details may be made herein without departing from the spirit and scope of the present invention as defined by the following claims.

The invention claimed is:

1. A wholly aromatic liquid crystalline polyester resin compound comprising:
    a wholly aromatic liquid crystalline polyester resin,
    a first inorganic filler having a surface resistivity of $10^{13}\Omega$/sq or more, and
    a second inorganic filler having a surface resistivity of $10^{13}\Omega$/sq or more and higher heat resistance (ASTM D648) and mechanical strength than those of the first inorganic filler,
    wherein the wholly aromatic liquid crystalline polyester resin compound has an arc resistance grade (ASTM D495) of 3 grade or lower and a heat resistance (ASTM D648) of 250° C. or more.

2. The wholly aromatic liquid crystalline polyester resin compound of claim 1, wherein the first inorganic filler comprises at least one selected from the group consisting of mica, talc, and wollastonite.

3. The wholly aromatic liquid crystalline polyester resin compound of claim 1, wherein an amount of the first inorganic filler is from 5 to 40 parts by weight based on 100 parts by weight of the wholly aromatic liquid crystalline polyester resin.

4. The wholly aromatic liquid crystalline polyester resin compound of claim 1, wherein the second inorganic filler comprises at least one selected from the group consisting of a long glass fiber, a short glass fiber, and whisker.

5. The wholly aromatic liquid crystalline polyester resin compound of claim 1, wherein an amount of the second inorganic filler is from 5 to 40 parts by weight based on 100 parts by weight of the wholly aromatic liquid crystalline polyester resin.

6. A part of an electric transformer, the part comprising the wholly aromatic liquid crystalline polyester resin compound of claim 1.

* * * * *